US012801479B2

(12) United States Patent
Eberlein et al.

(10) Patent No.: US 12,801,479 B2
(45) Date of Patent: Nov. 17, 2026

(54) INTELLIGENT DevOps ASSISTED ROOT CAUSE ANALYSIS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/788,586

(22) Filed: Jul. 30, 2024

(65) Prior Publication Data

US 2026/0037358 A1 Feb. 5, 2026

(51) Int. Cl.

| | |
|---|---|
| ***G06F 11/00*** | (2006.01) |
| ***G06F 8/71*** | (2018.01) |
| ***G06F 11/07*** | (2006.01) |
| ***G06F 11/22*** | (2006.01) |

(52) U.S. Cl.

CPC .............. *G06F 11/079* (2013.01); *G06F 8/71* (2013.01); *G06F 11/2252* (2013.01)

(58) Field of Classification Search

CPC ........................... G06F 11/079; G06F 11/2252

See application file for complete search history.

(56) References Cited

U.S. PATENT DOCUMENTS 11,573,848 B2 2/2023 Linck et al.
11,698,829 B2 7/2023 Aradhya et al.
12,487,875 B1 * 12/2025 Côrte-Real ......... G06F 11/0769
2021/0406041 A1 * 12/2021 Saraiya ................. G06F 16/287
2022/0066852 A1 * 3/2022 Ramanujan ......... G06F 11/0793
2025/0147832 A1 * 5/2025 Agrawal ............. G06F 11/0787
2025/0217715 A1 * 7/2025 So .......................... G06N 20/10

OTHER PUBLICATIONS

Wikipedia, "Directed Acyclic Graph" (Year: 2025).*
U.S. Appl. No. 18/488,159, filed Oct. 17, 2023, Eberlein et al.

* cited by examiner

*Primary Examiner* — Marc Duncan
*Assistant Examiner* — Gabriella Kanani Shelton
(74) *Attorney, Agent, or Firm* — Fish & Richardson P.C.

(57) ABSTRACT

A computer-implemented method includes processing, by an Intelligent Root Cause Analyzer (IRCA), an error message. The error message is categorized by an Error Categorizer of the IRCA as an Error Category. A code change related to the Error Category is searched for by the IRCA. An ID of an impacted application or service and a Change Category is received by a Code Repository and Build and Pipeline. The Error Category and the Change Category are compared by the IRCA. A Service Dependency Graph is searched by a Dependency Reader of the IRCA for services that are called by the impacted application or service. A Monitoring system is queried by the IRCA for potentially different error messages and derived Error Categories from the services called by the impacted application or service.

20 Claims, 6 Drawing Sheets

Populating the "Change + Impact DB" during Build and Deploy

INTELLIGENT DevOps ASSISTED ROOT CAUSE ANALYSIS

BACKGROUND

DevOps is a software development (Dev) and information technology (IT) operations (Ops) methodology. DevOps and is used as a set of practices and tools to integrate and automate work of software developers and IT operations to improve and shorten development lifecycles. Software applications built with a micro-services architecture are typically composed of several services, and, in a mesh of services, a root cause of an error is potentially hard to identify, since the application reporting the error calls many services, which in turn call other services—any of the called services could be the cause of the problem. Code ownership and operations of the services is often spread across different teams working independently, so affected software application owners are usually not aware of all changes going on, so identifying the root cause of an error in the code change of some remote service is very difficult and time consuming.

SUMMARY

The present disclosure describes providing intelligent DevOps assisted root cause analysis.

In an implementation, a computer-implemented method, comprises: processing, by an Intelligent Root Cause Analyzer (IRCA), an error message; categorizing, by an Error Categorizer of the IRCA and as an Error Category, the error message; searching, by the IRCA, for a code change related to the Error Category; receiving, by a Code Repository and Build and Pipeline, an ID of an impacted application or service and a Change Category; comparing, by the IRCA, the Error Category and the Change Category; searching, by a Dependency Reader of the IRCA, a Service Dependency Graph for services that are called by the impacted application or service; and querying, by the IRCA, a Monitoring system for potentially different error messages and derived Error Categories from the services called by the impacted application or service.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach permits automatically discovering a semantic link between data sets of different origins and formats (i.e., code changes and error messages are categorized and compared). Second, the described approach utilizes a set of repositories, logs, and models to relate "code" to a "deployed instance," and "change in code" to "deployed version" and to "error occurring for this deployed version." Third, with the described approach, data analysis to find a root cause in micro-services applications is assisted and a certain set of changes can be automatically related to resulting errors—providing a hint for a developer to analyze the changes first when the root cause of an error needs to be identified. Fourth, in case a relation between error and change is found, root cause analysis is faster and easier. If the analysis does not find a potential root cause, no additional time is lost for the developer (i.e., the process is reasonably fast and the approach does not output too many changes to be analyzed).

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
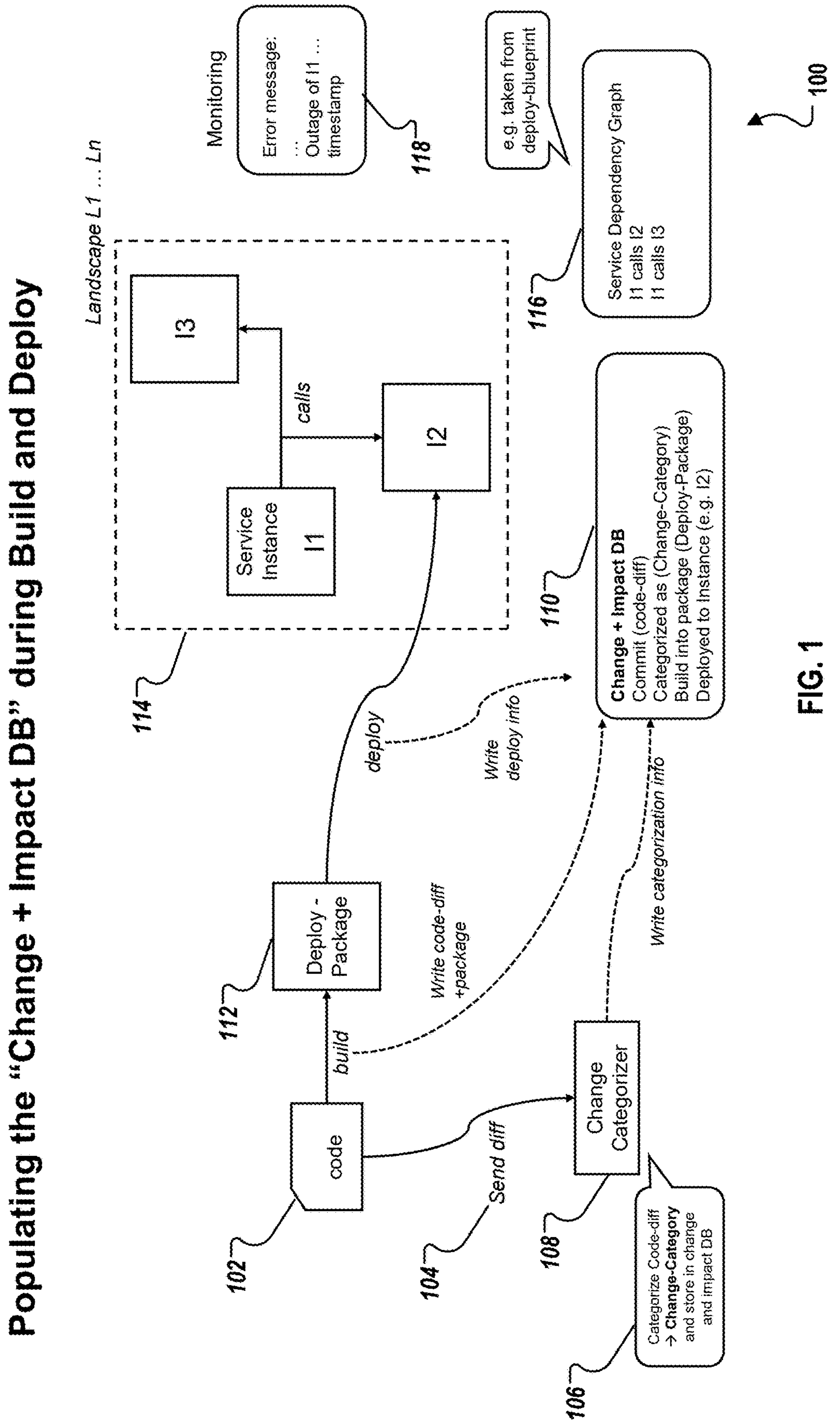
FIG. 1 is a block diagram illustrating data collection during development and change of a software application and its related components, according to an implementation of the present disclosure.

The following detailed description describes providing intelligent DevOps assisted root cause analysis and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

DevOps is a software development (Dev) and information technology (IT) operations (Ops) methodology. DevOps and is used as a set of practices and tools to integrate and automate work of software developers and IT operations to improve and shorten development lifecycles.

The described approach is related to software applications (or "applications"/"apps") built with a micro-services architecture. The software applications are typically composed of several services, and, in a mesh of services, a root cause of an error is potentially hard to identify, since the application reporting the error calls many services, which in turn call other services—any of the called services could be the cause of the problem. Code ownership and operations of the services is often spread across different teams working independently, so affected software application owners are usually not aware of all changes going on, so identifying the root cause of an error in the code change of some remote service is very difficult and time consuming.

The applications are typically developed with a code repository and a build-test-deploy pipeline. Typically, if an error occurs during use of the application by users, an incident is created including error information. Alternatively, application monitoring may identify issues and automatically raise alerts to an operations group, and developers are then asked to identify a root cause of the error to correct and to quickly deploy the correction to resolve the error for the user.

Additional complexity can occur in a situation where a component (e.g., a software application component or a service component) reporting an error has not been changed, but a change in a (directly or indirectly) called component causes a new problem. Typically, an application architecture or a deployment model needs to be consulted to identify which component(s) are called and then to investigate the component(s). For a manual root cause analysis, many data sources need to be consulted to finally derive a potential origin and owner of a component(s). The owner can then be contacted to find a solution for the problem.

A software coding change can lead to a new version of a service, which can cause problems to consuming services (or to their consuming services, and so on) resulting in errors and incidents. Analyzing a root cause of such problems manifesting at a top-level application can be complicated and time consuming in a complex service mesh.

For example, information to be analyzed for such a scenario is distributed:

Time of deployment of a new version should be (shortly) before the error occurs (and not later or long before). A time filter is needed.

A dependency graph of services calling other services: a service owner will know the services called directly by their own service, but potentially not services being called by the called service, and so on.

The actual code change being deployed—is it potentially related (i.e., could the code change have caused the error)? Semaintics of the code change and the error is automatically determined.

Ownership and responsibility are distributed across different teams. Typically, one development team does not have access to code or deployment logs of another component for analysis.

Error messages of a service used by another service or an application are potentially propagated to callers or users as different error messages. The original error message may be hidden in error logs and the returned error messages are potentially wrapped and forwarded instead of the error in its original form to the caller.

Teams do not have a lot of time to find a root cause of a problem and understand what to correct. When the application is failing for a certain functionality, users are impacted. Reaction time to resolve the problem (i.e., "time-to-recover") are business critical key performance indicators (KPIs) and excellent values are key for user satisfaction and application success. Incident routing between different components to reach owners of an origin of the problem can take a lot of valuable time.

Described is an approach to assist developers and IT professionals in analyzing errors in a micro-services application and to identify a root cause in code changes having been deployed before the errors occurred. The approach uses machine learning (ML) to categorize errors and code changes, relate them, and use application dependency information to identify components used by the failing application to extend code analysis to these components.

Approach and Procedure

The approach (useable in test or production landscapes) is to assist root cause analysis by finding relations between code changes in one component and errors in a software application calling the component comprising the changed code. It is achieved by combining information from several sources: categorizing code changes and errors using generative pre-trained transformers (e.g., CHATGPT) and navigating with a relational search through the dependency graph of the application and used services and components used therein, which can be related to code repositories. With the information from a build and deploy pipeline, it is known which change(s) in a particular service deployment is related to a certain code change. With information from known deployment blueprints and landscape directories, it is also known which application calls which services, and which other services these services call.

At a high-level, the idea is to assign an error message to an error category from an alert sent by monitoring or contained in an incident created by users using an application. Source code of the application is scanned for changes having been deployed shortly before the error occurred. If a code change is found, it is categorized, then the error and code change categories are compared. If matching, the change is a good candidate for being the root cause. If no code change to the application itself is the root cause, the search continues with services being called by the application. Services source code is analyzed in the same way. If a match is found, then the search continues with a next set of services being called by the prior mentioned services, and so on.

Semantic error categorization, code change categorization, and mapping can be achieved with ML approaches. An example of a ML approach includes generative, pre-trained transformers using large language models (LLMs).

The described approach can be further extended by adjusting (mapping) an error category during a search in the dependency graph to an error category detected in a called service and then continuing the search for the adjusted error category. This mapped error category is then additionally used for further analysis if a code change category matches the error.

A further improvement of the approach can be to create a model of error wrappings in services of the micro service application. The model can contain information, how errors propagate from the called service to the callers—recursively—and how errors and their categories are reported. The model can then be used to extend a search to error categories other than those identified by the callers.

From all errors of all categories, the model filters on related errors in the search, which are part of the model. The related errors have been seen in the past and are trained into the model.

This can be a first search strategy for a more precise and efficient search. If no root cause is found, the search can be repeated without the filter set, as potentially a new mapping is occurring in an error situation not yet part of the model.

Yet another improvement can be to cluster incoming alerts or incidents based on contained errors and their categories. If several applications report errors of the same category, the dependency search first focuses on analysis of the commonly used services (recursively). If a root cause is found, it is likely valid for the complete cluster of incoming alerts or incidents. If no root cause is found in the commonly used services, the individual process is used, extending the search to services that are not used by all failing applications.

The root cause analysis can be automated for a set of cases. The described approach reduces load from support, developers, and IT professionals and speeds up error correction for users of an application.

Process

Preparation during Development of a Code Change

FIG. 1 is a block diagram illustrating data collection during development and change of a software application and its related components, according to an implementation of the present disclosure.

The process starts with preparation steps during development of a code change to code 102. When the code change is submitted to a code repository (refer to FIG. 2), a code difference (code diff) 104 is determined. For the code diff, a Change Category 106 is determined by a Change Categorizer 108 component using a generative pre-trained transformer using LLMs, typically a model trained for the programming language used. The Change Categorizer 108 is prompted to categorize the change to a list of pre-defined change categories that are later matched to errors occurring at runtime. Examples can include changes impacting networking, performance, scalability, Application Programming Interfaces (APIs), authorization, etc. The result is stored in a "Change and Impact Database" 110.

When the code change is built and deployed, additional information is stored in the Change and Impact Database 110:

- The name of the package being built with the changed code.
- The timestamp of the deployment of a newly created deployment package 112 and the landscape 114 it is deployed to.
- The service ID the deployment updates with the newly created deployment package 112.
- Potentially: if the code change impacts a dependency graph, the change is propagated to the Service Dependency Graph 116.

With this preparation, root cause analysis can be executed when an error occurs. The process is started with an incoming Support Ticket ("Incident") (refer to FIG. 2) or Alert Message (refer to FIG. 2) from a Monitoring 118 system. The ticket or alert needs to contain information on the problem (e.g., the error message, the time stamp, when the error occurred and the application ID or service ID, and where the alert originates from).

Intelligent Root Cause Analyzer

Figure 2:
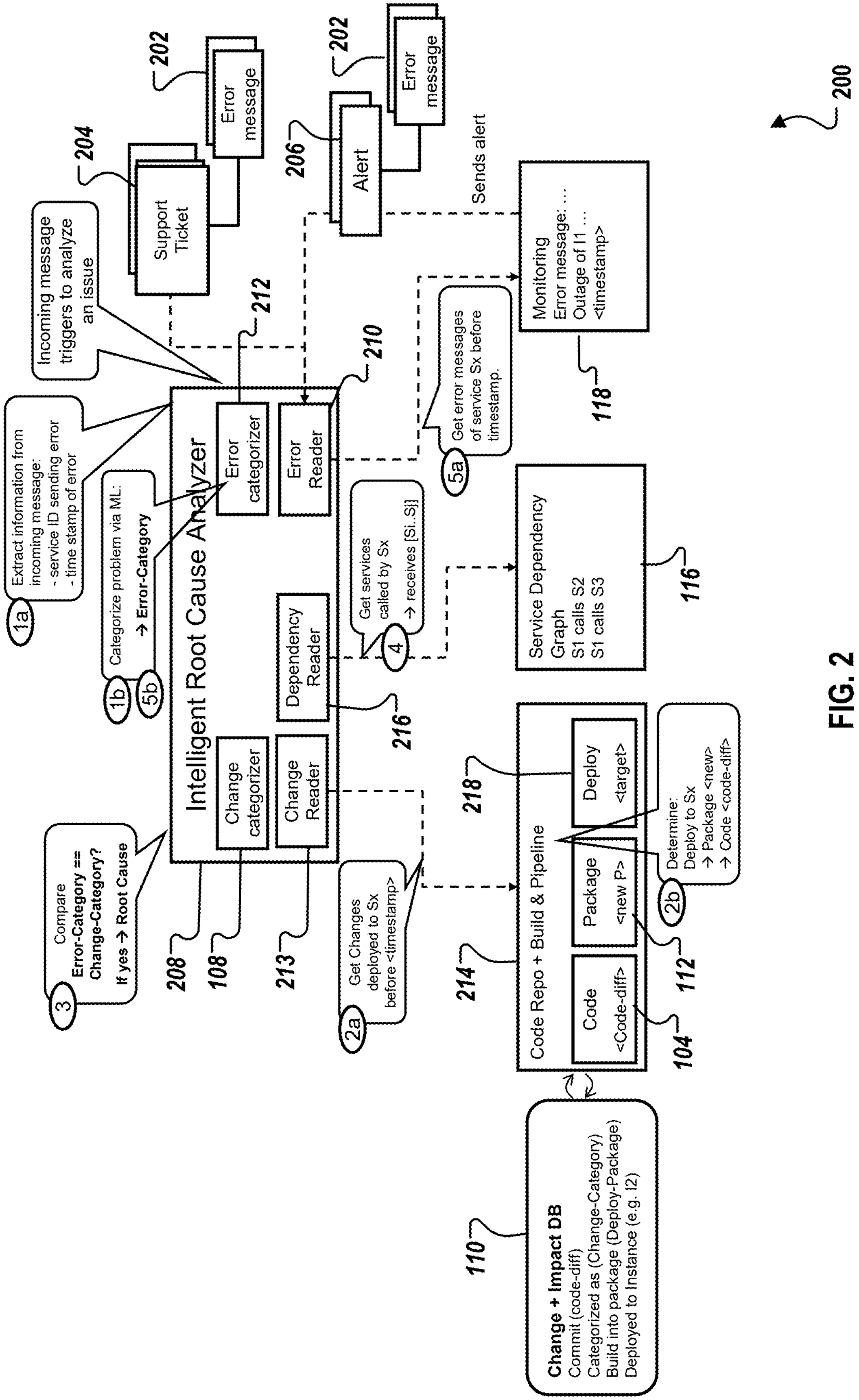
FIG. 2 is a block diagram illustrating components and interactions between components of an intelligent root cause analyzer (IRCA), according to an implementation of the present disclosure.

FIG. 2 is a block diagram illustrating components and interactions between components of an Intelligent Root Cause Analyzer (IRCA), according to an implementation of the present disclosure.

At (1), an error message from a Support Ticket 204 or Alert 206 is processed by an "Intelligent Root Cause Analyzer" (IRCA) 208.

At (1*a*), an IRCA Error Reader 210 reads the error message 202 and extracts required information (e.g., error message, time stamp, and application ID or service ID).

At (1*b*), the error message is categorized by an Error Categorizer 212. In some implementations, the Error Categorizer 212 uses generative, pre-trained transformers using LLMs, which is typically a model trained for the language used in the Support Ticket 204 and with technical documents on the infrastructure or used platform (e.g., CLOUD FOUNDRY, KUBERNETES, or HYPERSCALER NATIVE). An Error Category from a list of pre-defined error categories is determined.

At (2), the IRCA 208 searches for a code change related to the Error Category.

At (2*a*), code change(s) are read by a Change Reader 213. The code changes are from an update of an impacted application or service specified in the Support Ticket 204 or Alert 206. The deployment will have happened (shortly) before the error message 202 was written.

(2*b*) The Code Repository and Build and Pipeline 214 system receives the ID of the impacted application and service. It reads from the Change and Impact DB 110 which package was deployed to the impacted application or service, and further, which code changes were last built into the package 112. Then it reads the Change Category.

At (3), the IRCA 208 compares the Error Category and Change Category. If there is a match, a potential root cause is found and reported as potential root cause. Then, the IRCA 208 continues a search down the dependency chain.

At (4), the IRCA 208 uses a Dependency Reader 216 to query the Service Dependency Graph 116 for services that are called by the impacted application or service. The Service Dependency Graph 116 returns a set of services with ID. If no more services are found, then exit.

At (5), the IRCA 208 queries the Monitoring 118 system.

At (5*a*), for the newly received set of services from the Service Dependency Graph 116, obtain potentially different error messages and derived Error Categories from the set of services from the services called by the impacted application or service after deploy time (and before or at the same time as the initial error message timestamp) read from the Change and Impact DB 110.

If the query for all the services does not return an additional error message, continue. If the query returns an error message, perform (5*b*).

At (5*b*), categorize the newly read error message using the Error Categorizer 212—an Error Category*. Note that this error category is potentially a different Error Category than the initially computed or the one computed before). This error category is then used as an additional possible match when comparing Error Categories to Change Categories.

If a model of error wrappings was built up, only error categories that may have been wrapped in the original Error Category are considered when continuing the search, others (i.e., unrelated errors) are discarded from the search.

Continue the loop at (3) with comparing the Change Category and original Error Category, plus the newly added Error Category*. If they match, consider the root cause found and report as potential root cause. The IRCA 208 continues with a recursive search for services that are used by these services.

In some implementations, the root cause(s) identified is/are listed with: 1) code change (including its Change Category); 2) the related source code files and changed fragment(s); 3) the initial error message (including Error Category and the application ID having shown the error) and all intermediary Error Messages and Error Categories; 4) the Error message and Error Category matching the Change Category; 5) the deployed package version; 6) the deployment time; and 6) the deploy target: application ID or service ID.

Components

With additional detail, the IRCA 208 includes:

- Error Reader 210, which: 1) reads error messages from an incoming alert 206 or Support Ticket 204; 2) extracts information on an origin of the error (e.g., timestamp, service ID sending the error, and error message); and 3) passes the error message to an Error Categorizer 212.
- Error Categorizer 212, which obtains an error message and categorizes the message, determining the Error Category.
- Change Reader 213, which: 1) reads from the Change and Impact DB 110 (or from the Code Repository and Build and Pipeline 214 system); 2) reads a code diff using the Change Category; 3) can specify a time-range of the code changes and deployment desired (e.g., before the error time stamp); and 4 can specify the deploy target 218 (e.g., a service instance), which was updated by the deployment.
- Change Categorizer 108, which obtains a code file and the code diff and determines a Change Category.
- Dependency Reader 216, which obtains an application ID or service ID and returns the services called by the application or service.

The described approach uses existing infrastructure (e.g., a code repository and Build and Deploy pipeline), which is amended by the Change and Impact DB 110 (new—Change Categorizer 108):

- Storing information on a code change (code diff).
- The code change is categorized by the Change Categorizer 108, the resulting category is stored with the code diff.
- Storing information, which package is crated during build with the code (Deploy Package 112).
- Storing information, when and to which instances and landscapes the deploy package 112 with the code change is deployed to.

Other existing infrastructure which is used and leveraged for reading errors (e.g., with the Error Categorizer), includes:

- Service Dependency Graph 116, which provides: 1) information on applications, which services they consume; 2) which services these services consume—and so on; and 3) which can be taken from an "architecture blueprint" of the application or deploy charts.
- Monitoring 118, which: 1) monitors applications and services; 2) has an interface to query for error messages of certain services or applications; and 3) sends Alerts 206 (directly or using an intermediary infrastructure not shown).
- Support Tickets system, where: 1) users can create Support Tickets 204 for problems; 2) attach error information; and 3) Support Tickets 204 can also be generated from an operations infrastructure or created by test teams.

Error Promotion Model

A service forwarding an error message from a called service or process will not always send the same error message to its callers. Instead, a service will often create its own error message with terminology, context, and message IDs reflecting the service. For example, a file-input/output (I/O) error reported by a tool can be translated/exposed by a service as "No access" or "Could not write file." The translated error message may or may not be in the same Error Category as the original error message.

For an application calling several services (e.g., Application 1 calling Service A, Service A calling B, etc.), each error situation occurring in a test or production environment which is noticeable in Application 1 can be stored with information on the errors reported. For example:

- Service B reporting error E1,
- Service A calling Service B catches the error E1 and sends it wrapped in error E2 to its caller, and
- Application 1 calling Service A receives E2, and reports it wrapped in error E3 to the user.

For more complex meshes of service, a large number of error messages can be monitored. The described approach collects the error propagation scenarios and creates a model. The model contains all errors monitored, which had been propagated to the application, including the information of which propagation an error of a service had taken in the past (such as, E1→E2→E3, etc.).

The model can be queried with an error message to determine how it is wrapped. For example:

- Application 1, error E2 from Service A reported to user as E3.
- Service A, error E1 from Service B reported to Application 1 as E2.

The mapping is relevant if derived Error Categories from an original and wrapped error message are different, otherwise it does not matter as the search happens only on categories, not actual messages. However, if the Error Category changes, then this information can be relevant when searching for matching Change Categories.

Figure 3:
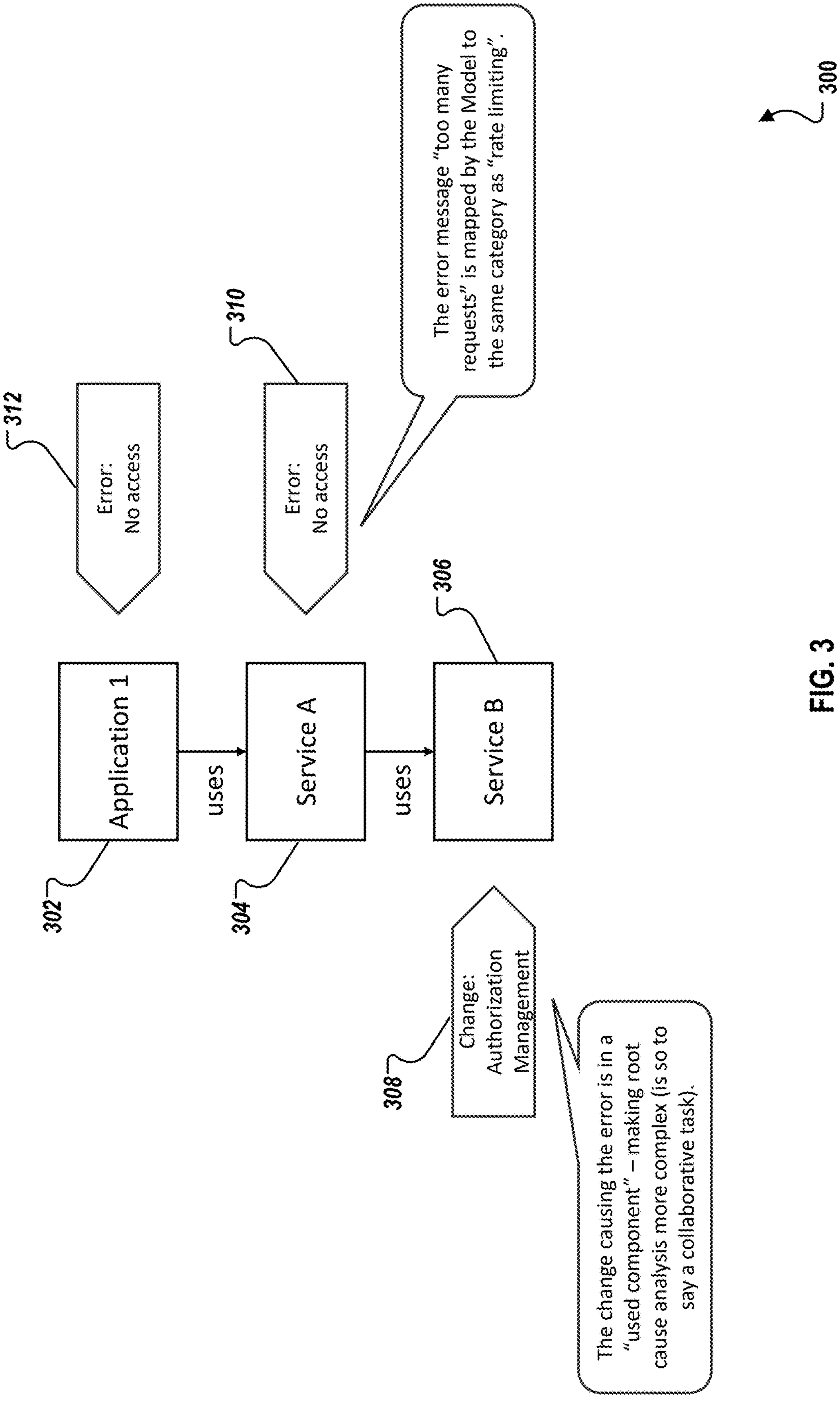
FIG. 3 is a block diagram illustrating an example system with a software application and two services reporting inconsistent errors to a user, according to an implementation of the present disclosure.

FIG. 3 is a block diagram illustrating an example system 300 with a software application and two services reporting inconsistent errors to a user, according to an implementation of the present disclosure. System 300 has an Application 1 302, Service A 304, and Service B 306. Application 1 302 uses Service A 304, and Service A 304 uses Service B 306.

A change 308 in Service B 306 with respect to Authorization Management ("too many requests") is in a used component, making root cause analysis more complex. The error in Service B 306 is received by Service A 304 and mapped by the model to the same category as "rate limiting." The mapped error message at Service A 304 is passed to Application 1 302. Application 302 reports the error 312 to a user according to the model.

Error Clustering to Identify Common Root Cause

Typically, re-use services are used by many applications. If a re-use service is the root cause of a problem, potentially many applications are impacted.

It is beneficial to identify clusters of related error messages and to find a common root of the clusters. Different applications do not necessarily provide the same error message to users, if a re-use service sends an error message. However, typically, the error messages are semantically similar if the same error is the root cause.

In this way, effort for the developers can be further reduced. Instead of the previously described approach which provides a hint for a root cause to all developers of all impacted applications and all of them analyzing a code change or asking a responsible developer about the code change, the system can already cluster the related error messages and generate information of potentially related errors.

If a set of error messages are detected in a relatively short period of time, the errors are categorized, and the error categories are compared. If they are matching, first an analysis is done for commonly used services (and services used by these etc.) and changes therein. With respect to time scale, time scale depends on deploy frequency and usage frequency. For example, if a component is deployed daily and there are a lot of users, this time scale can be hours. However, if the component is deployed once every few weeks and has only very few users, the time scale can be days.

A potentially found root cause provides additional information to the developers: 1) information, that the potentially found root cause is in an error cluster, including all the applications reporting errors and their individual error messages and 2) that service A (in the following example) is the first commonly used service.

If this process identifies a commonly used service, but the search within this service and its called services does not find a potential root cause, the cluster is dissolved, and the incoming errors are analyzed individually as previously described. This approach also improves search precision, as initially only those services are considered that are used by all failing applications.

Figure 4:
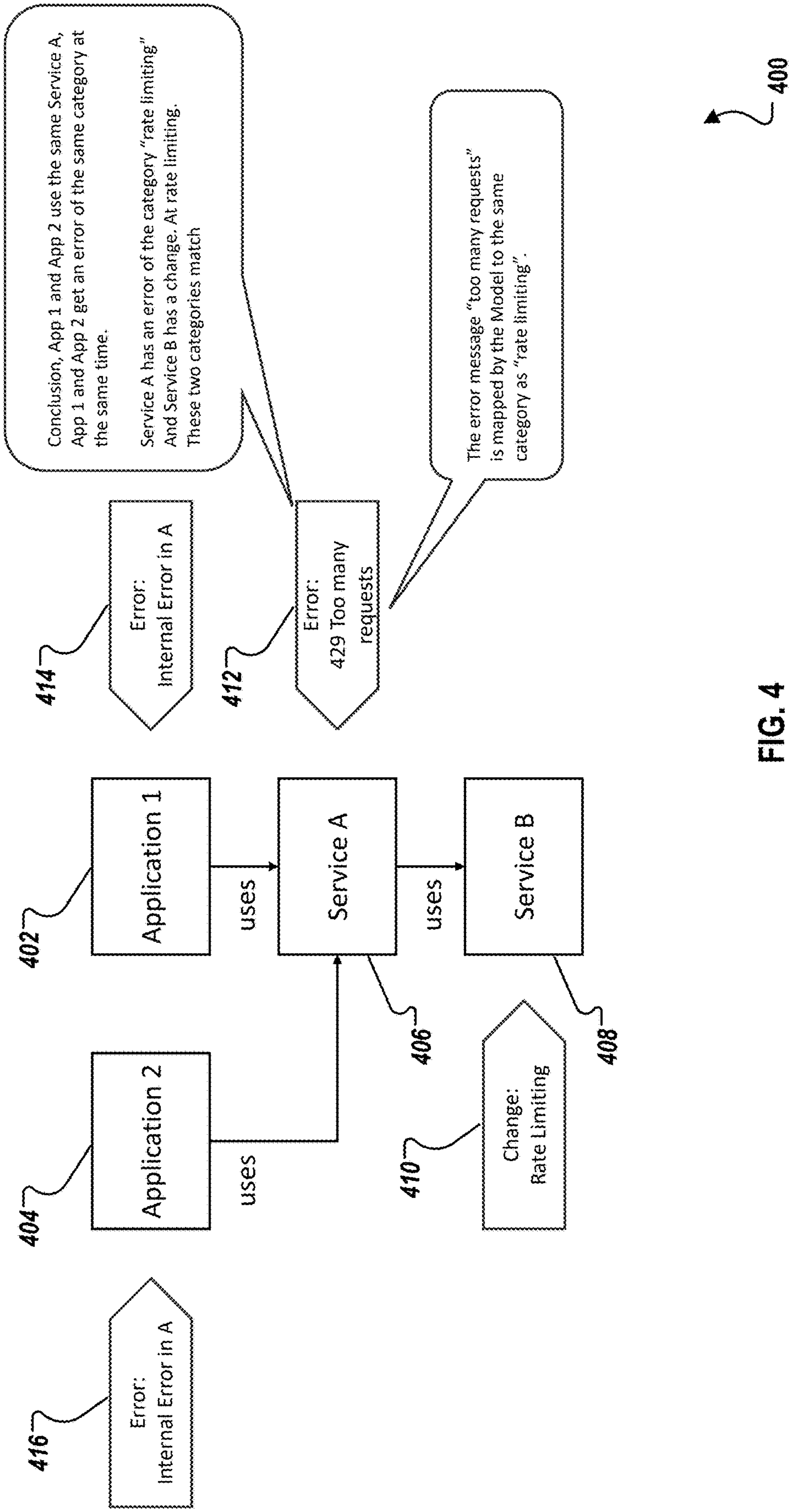
FIG. 4 is a block diagram illustrating an example system with two software applications using a common re-use service and both reporting errors to a user, according to an implementation of the present disclosure.

FIG. 4 is a block diagram illustrating an example system 400 with two software applications using a common re-use service and both reporting errors to the user, according to an implementation of the present disclosure.

System 400 has an Application 1 402, Application B 404, Service A 406, and Service B 408. Application 1 402 and Application 2 404 both use Service A 406, and Service A 406 uses Service B 408.

A rate limiting change 410 is made in Service B 408. An error generated by Service B 408 ("too many requests") is received by Service A 406 and mapped as error 412 to the same category as "rate limiting." The error in Service B 306 is received by Service A 304 and mapped by the model to the same category as "rate limiting."

A conclusion is made that Application 1 402 and Application 2 404 use the same Service A 406 and received an error ("Internal Error in A") (414 and 416, respectively) of the same category at the same time. Service A 406 has an error of category "rate limiting" and Service B 408 has a change. At rate limiting, these two categories match.

Figure 5:
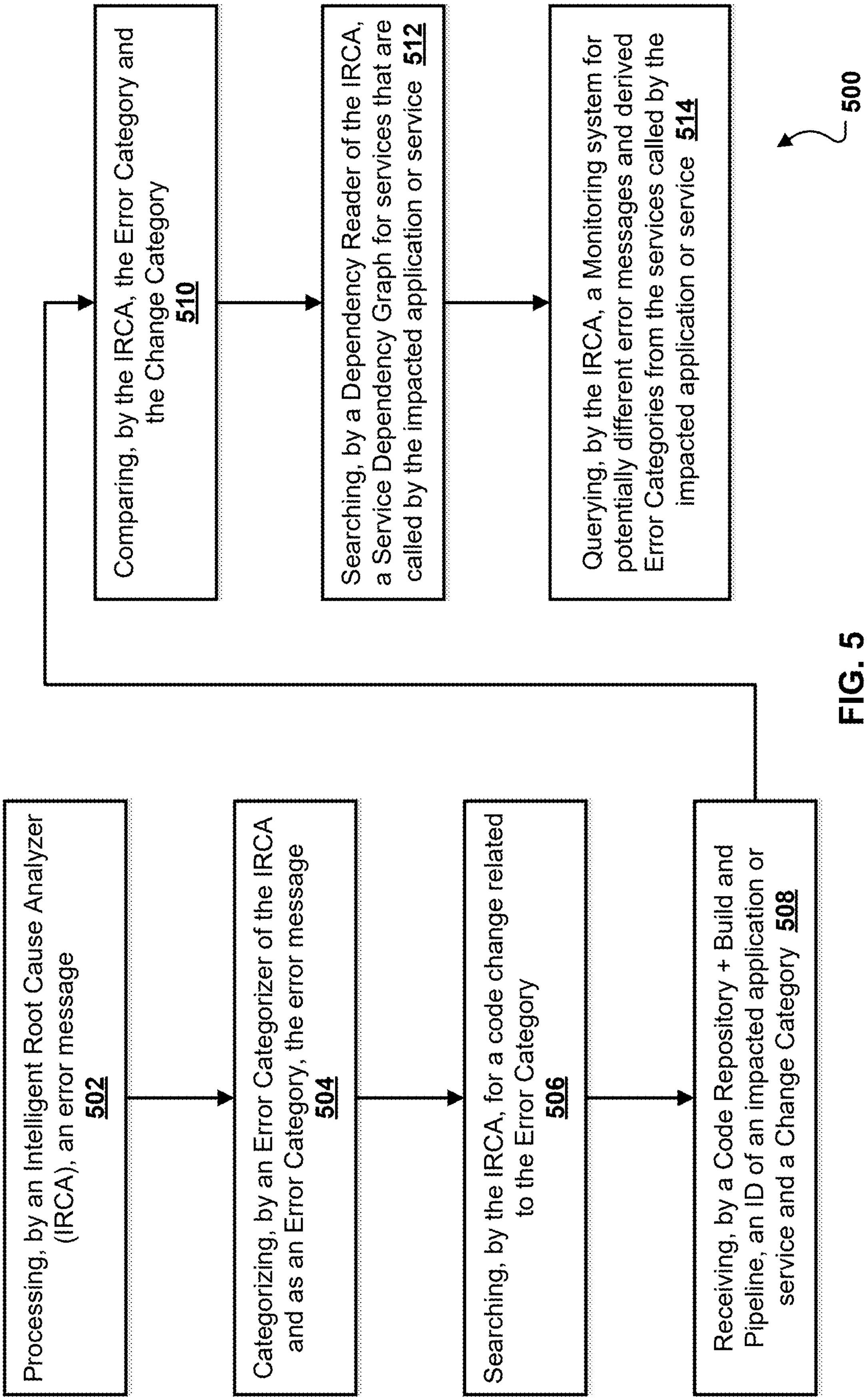
FIG. 5 is a flowchart illustrating an example of a computer-implemented method for providing intelligent DevOps assisted root cause analysis, according to an implementation of the present disclosure.

FIG. 5 is a flowchart illustrating an example of a computer-implemented method 500 for providing intelligent DevOps assisted root cause analysis, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, an Intelligent Root Cause Analyzer (IRCA) processes an error message. In some implementations, an IRCA Error Reader reads the error message and extracts required information, including error message, time stamp, and application ID or service ID. In some implementations, the error message is processed from a Support Ticket or an Alert. From 502, method 500 proceeds to 504.

At 504, the error message is categorized by an Error Categorizer of the IRCA as an Error Category. In some implementations, the Error Categorizer uses generative, pre-trained transformers using large language models (LLMs) trained for language used in the Support Ticket or the Alert. From 504, method 500 proceeds to 506.

At 506, a code change related to the Error Category is searched for by the IRCA. A Change Reader of the IRCA reads code changes resulting from an update of the impacted application or service, where Code Repository and Build and Pipeline reads from a Change and Impact DB which package was deployed to the impacted application or service, which code changes were last built into the package, and the Change Category. From 506, method 500 proceeds to 508.

At 508, an ID of an impacted application or service and a Change Category is received by a Code Repository and Build and Pipeline. From 508, method 500 proceeds to 510.

At 510, the Error Category and the Change Category are compared by the IRCA. That a match exists between the Error Category and the Change Category can be reported by the IRCA. From 510, method 500 proceeds to 512.

At 512, a Service Dependency Graph is searched by a Dependency Reader of the IRCA for services that are called by the impacted application or service. From 512, method 500 proceeds to 514.

At 514, a Monitoring system is queried by the IRCA for potentially different error messages and derived Error Categories from the services called by the impacted application or service. If querying, by the IRCA, a Monitoring system returns an error message, an Error Categorizer of the IRCA categories the error message as a potentially different Error Category. After 514, method 500 can stop.

Figure 6:
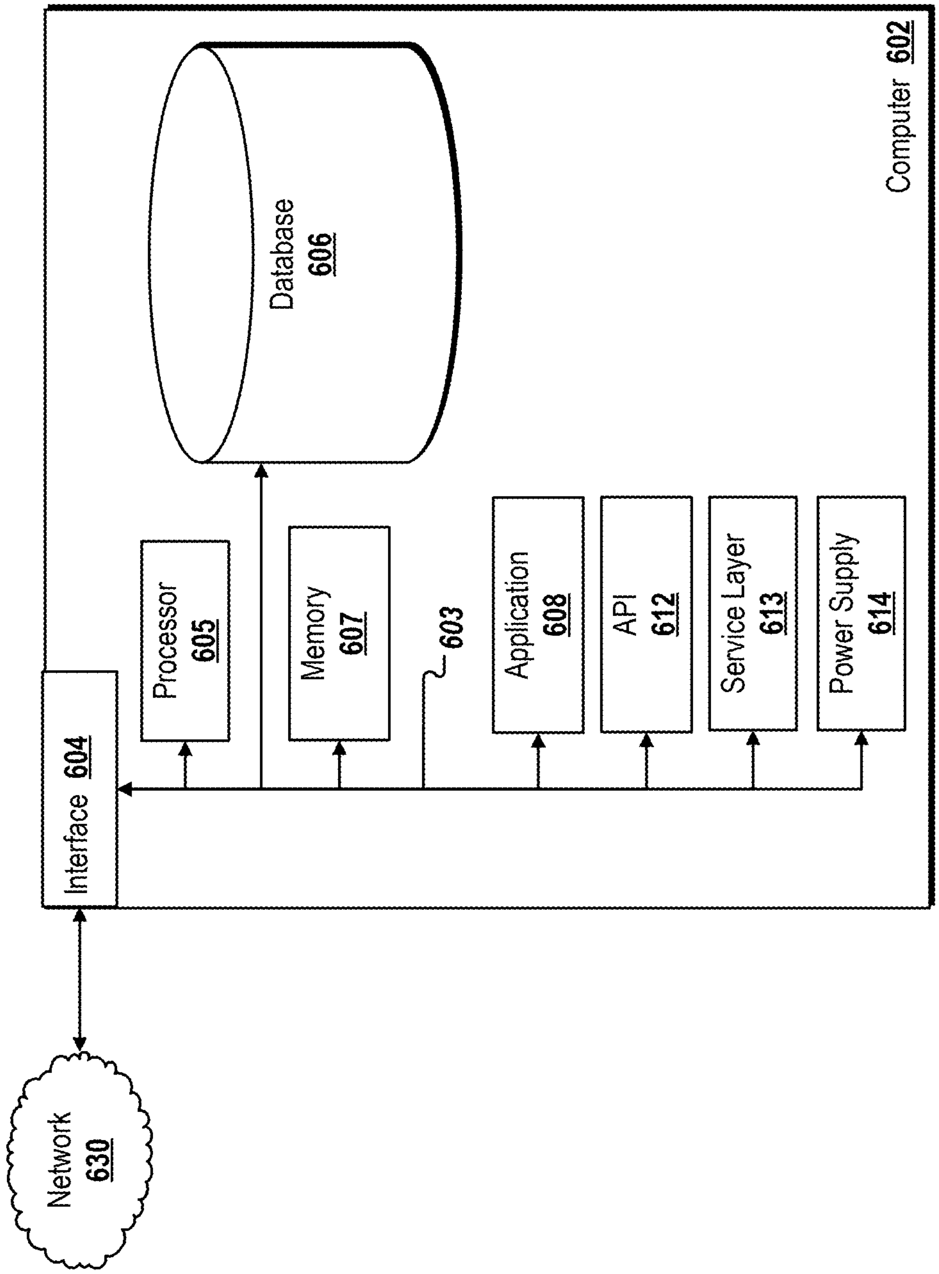
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, computer-implemented system 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. The Database 606 can hold and operate on at least any data type mentioned or any data type consistent with this disclosure.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: processing, by an Intelligent Root Cause Analyzer (IRCA), an error message; categorizing, by an Error Categorizer of the IRCA and as an Error Category, the error message; searching, by the IRCA, for a code change related to the Error Category; receiving, by a Code Repository and Build and Pipeline, an ID of an impacted application or service and a Change Category; comparing, by the IRCA, the Error Category and the Change Category; searching, by a Dependency Reader of the IRCA, a Service Dependency Graph for services that are called by the impacted application or service; and querying, by the IRCA, a Monitoring system for potentially different error messages and derived Error Categories from the services called by the impacted application or service.

The foregoing and other described implementations can each, optionally, include one or more of the following features:

A first feature, combinable with any of the following features, wherein an IRCA Error Reader reads the error message and extracts required information, including error message, time stamp, and application ID or service ID.

A second feature, combinable with any of the previous or following features, wherein the error message is processed from a Support Ticket or an Alert.

A third feature, combinable with any of the previous or following features, wherein the Error Categorizer uses generative, pre-trained transformers using large language models (LLMs) trained for language used in the Support Ticket or the Alert.

A fourth feature, combinable with any of the previous or following features, comprising: reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

A fifth feature, combinable with any of the previous or following features, comprising: reporting, by the IRCA, that a match exists between the Error Category and the Change Category.

A sixth feature, combinable with any of the previous or following features, comprising: if querying, by the IRCA, a Monitoring system returns an error message, categorizing, by the Error Categorizer of the IRCA, the error message as a potentially different Error Category.

In a second implementation, a non-transitory, computer-readable medium storing one or more instructions executable by a computer system to perform one or more operations, comprising: processing, by an Intelligent Root Cause Analyzer (IRCA), an error message; categorizing, by an Error Categorizer of the IRCA and as an Error Category, the error message; searching, by the IRCA, for a code change related to the Error Category; receiving, by a Code Repository and Build and Pipeline, an ID of an impacted application or service and a Change Category; comparing, by the IRCA, the Error Category and the Change Category; searching, by a Dependency Reader of the IRCA, a Service Dependency Graph for services that are called by the impacted application or service; and querying, by the IRCA, a Monitoring system for potentially different error messages and derived Error Categories from the services called by the impacted application or service.

The foregoing and other described implementations can each, optionally, include one or more of the following features:

A first feature, combinable with any of the following features, wherein an IRCA Error Reader reads the error message and extracts required information, including error message, time stamp, and application ID or service ID.

A second feature, combinable with any of the previous or following features, wherein the error message is processed from a Support Ticket or an Alert.

A third feature, combinable with any of the previous or following features, wherein the Error Categorizer uses generative, pre-trained transformers using large language models (LLMs) trained for language used in the Support Ticket or the Alert.

A fourth feature, combinable with any of the previous or following features, comprising: reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

A fifth feature, combinable with any of the previous or following features, comprising: reporting, by the IRCA, that a match exists between the Error Category and the Change Category.

A sixth feature, combinable with any of the previous or following features, comprising: if querying, by the IRCA, a Monitoring system returns an error message, categorizing, by the Error Categorizer of the IRCA, the error message as a potentially different Error Category.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: processing, by an Intelligent Root Cause Analyzer (IRCA), an error message; categorizing, by an Error Categorizer of the IRCA and as an Error Category, the error message; searching, by the IRCA, for a code change related to the Error Category; receiving, by a Code Repository and Build and Pipeline, an ID of an impacted application or service and a Change Category; comparing, by the IRCA, the Error Category and the Change Category; searching, by a Dependency Reader of the IRCA, a Service Dependency Graph for services that are called by the impacted application or service; and querying, by the IRCA, a Monitoring system for potentially different error messages and derived Error Categories from the services called by the impacted application or service.

The foregoing and other described implementations can each, optionally, include one or more of the following features:

A first feature, combinable with any of the following features, wherein an IRCA Error Reader reads the error message and extracts required information, including error message, time stamp, and application ID or service ID.

A second feature, combinable with any of the previous or following features, wherein the error message is processed from a Support Ticket or an Alert.

A third feature, combinable with any of the previous or following features, wherein the Error Categorizer uses generative, pre-trained transformers using large language models (LLMs) trained for language used in the Support Ticket or the Alert.

A fourth feature, combinable with any of the previous or following features, comprising: reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

A fifth feature, combinable with any of the previous or following features, comprising: reporting, by the IRCA, that a match exists between the Error Category and the Change Category.

A sixth feature, combinable with any of the previous or following features, comprising: if querying, by the IRCA, a Monitoring system returns an error message, categorizing, by the Error Categorizer of the IRCA, the error message as a potentially different Error Category.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
- processing, by an Intelligent Root Cause Analyzer (IRCA), an error message associated with an impacted application or service resulting from an execution of the impacted application or service;
- categorizing, by an Error Categorizer of the IRCA and as an Error Category, the error message;
- searching, by the IRCA, for a code change of the impacted application or service that is related to the Error Category and that was deployed prior to a timestamp of the error message, wherein searching for the code change comprises querying a Code Repository and Build and Pipeline to correlate a deployment timestamp of the code change with the timestamp of the error message;
- receiving, by the Code Repository and Build and Pipeline, an ID of the impacted application or service and a Change Category;
- comparing, by the IRCA, the Error Category and the Change Category;
- searching, by a Dependency Reader of the IRCA, a Service Dependency Graph for services that are called by the impacted application or service; and
- querying, by the IRCA, a Monitoring system for potentially different error messages and derived Error Categories from the services called by the impacted application or service, wherein the derived Error Categories comprise original error messages wrapped and forwarded by the services called by the impacted application or service.

2. The computer-implemented method of claim 1, wherein an IRCA Error Reader reads the error message and extracts required information, including error message, time stamp, and application ID or service ID.

3. The computer-implemented method of claim 1, wherein the error message is processed from a Support Ticket or an Alert.

4. The computer-implemented method of claim 3, wherein the Error Categorizer uses generative, pre-trained transformers using large language models (LLMs) trained for language used in the Support Ticket or the Alert.

5. The computer-implemented method of claim 3, comprising:
- reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

6. The computer-implemented method of claim 1, comprising:
- reporting, by the IRCA, that a match exists between the Error Category and the Change Category.

7. The computer-implemented method of claim 1, comprising:
- if querying, by the IRCA, a Monitoring system returns an error message, categorizing, by the Error Categorizer of the IRCA, the error message as a potentially different Error Category.

8. A non-transitory, computer-readable medium storing one or more instructions executable by a computer system to perform one or more operations, comprising:
- processing, by an Intelligent Root Cause Analyzer (IRCA), an error message associated with an impacted application or service resulting from an execution of the impacted application or service;
- categorizing, by an Error Categorizer of the IRCA and as an Error Category, the error message;
- searching, by the IRCA, for a code change of the impacted application or service that is related to the Error Category and that was deployed prior to a timestamp of the error message, wherein searching for the code change comprises querying a Code Repository and Build and Pipeline to correlate a deployment timestamp of the code change with the timestamp of the error message;
- receiving, by the Code Repository and Build and Pipeline, an ID of the impacted application or service and a Change Category;
- comparing, by the IRCA, the Error Category and the Change Category;
- searching, by a Dependency Reader of the IRCA, a Service Dependency Graph for services that are called by the impacted application or service; and
- querying, by the IRCA, a Monitoring system for potentially different error messages and derived Error Categories from the services called by the impacted application or service; wherein the derived Error Categories comprise original error messages wrapped and forwarded by the services called by the impacted application or service.

9. The non-transitory, computer-readable medium of claim 8, wherein an IRCA Error Reader reads the error message and extracts required information, including error message, time stamp, and application ID or service ID.

10. The non-transitory, computer-readable medium of claim 8, wherein the error message is processed from a Support Ticket or an Alert.

11. The non-transitory, computer-readable medium of claim 10, wherein the Error Categorizer uses generative, pre-trained transformers using large language models (LLMs) trained for language used in the Support Ticket or the Alert.

12. The non-transitory, computer-readable medium of claim 10, comprising:

reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

13. The non-transitory, computer-readable medium of claim 8, comprising:

reporting, by the IRCA, that a match exists between the Error Category and the Change Category.

14. The non-transitory, computer-readable medium of claim 8, comprising:

if querying, by the IRCA, a Monitoring system returns an error message, categorizing, by the Error Categorizer of the IRCA, the error message as a potentially different Error Category.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

processing, by an Intelligent Root Cause Analyzer (IRCA), an error message associated with an impacted application or service resulting from an execution of the impacted application or service;

categorizing, by an Error Categorizer of the IRCA and as an Error Category, the error message;

searching, by the IRCA, for a code change of the impacted application or service that is related to the Error Category and that was deployed prior to a timestamp of the error message, wherein searching for the code change comprises querying a Code Repository and Build and Pipeline to correlate a deployment timestamp of the code change with the timestamp of the error message;

receiving, by the Code Repository and Build and Pipeline, an ID of the impacted application or service and a Change Category;

comparing, by the IRCA, the Error Category and the Change Category;

searching, by a Dependency Reader of the IRCA, a Service Dependency Graph for services that are called by the impacted application or service; and querying, by the IRCA, a Monitoring system for potentially different error messages and derived Error Categories from the services called by the impacted application or service, wherein the derived Error Categories comprise original error messages wrapped and forwarded by the services called by the impacted application or service.

16. The computer-implemented system of claim 15, wherein an IRCA Error Reader reads the error message and extracts required information, including error message, time stamp, and application ID or service ID.

17. The computer-implemented system of claim 15, wherein the error message is processed from a Support Ticket or an Alert.

18. The computer-implemented system of claim 17, wherein the Error Categorizer uses generative, pre-trained transformers using large language models (LLMs) trained for language used in the Support Ticket or the Alert.

19. The computer-implemented system of claim 17, comprising:

reading, by a Change Reader of the IRCA, code changes resulting from an update of the impacted application or service, wherein the Code Repository and Build and Pipeline reads from a Change and Impact DB which package was deployed to the impacted application or service, which code changes were last built into the package, and the Change Category.

20. The computer-implemented system of claim 15, comprising:

reporting, by the IRCA, that a match exists between the Error Category and the Change Category.

* * * * *